United States Patent
Agrawal et al.

(10) Patent No.: US 12,314,579 B2
(45) Date of Patent: May 27, 2025

(54) MANAGING MULTIPLE ENERGY STORAGE DEVICES IN AN ELECTRONIC DEVICE BASED ON ENVIRONMENTAL CONDITIONS

(71) Applicant: MOTOROLA MOBILITY LLC, Wilmington, DE (US)

(72) Inventors: Amit Kumar Agrawal, Bangalore (IN); Xiaofeng Zhu, Nanjing (CN); Rohit Sisodia, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 112 days.

(21) Appl. No.: 18/481,155

(22) Filed: Oct. 4, 2023

(65) Prior Publication Data

US 2024/0427503 A1  Dec. 26, 2024

Related U.S. Application Data

(63) Continuation of application No. PCT/CN2023/101390, filed on Jun. 20, 2023.

(51) Int. Cl.
*G06F 3/06* (2006.01)
*H02J 7/00* (2006.01)
*H02J 7/34* (2006.01)

(52) U.S. Cl.
CPC .......... *G06F 3/0625* (2013.01); *G06F 3/0653* (2013.01); *G06F 3/0671* (2013.01);
(Continued)

(58) Field of Classification Search
CPC .... G06F 3/0625; G06F 3/0653; G06F 3/0671; H02J 7/0048; H02J 7/007192; H02J 7/34
See application file for complete search history.

(56) References Cited

U.S. PATENT DOCUMENTS

2016/0299010 A1   10/2016  Park et al.
2018/0262043 A1*  9/2018   Yi ........................... H02J 50/10
(Continued)

FOREIGN PATENT DOCUMENTS

CN   106817498 A   6/2017
CN   109327611 A   2/2019

OTHER PUBLICATIONS

International Search Report and Written Opinion, Patent Cooperation Treaty, International Application No. PCT/CN2023/101390, Dec. 22, 2023.

*Primary Examiner* — Terrell S Johnson
(74) *Attorney, Agent, or Firm* — Isidore PLLC

(57) ABSTRACT

An electronic device, a method and a computer program product for selecting at least one of a first energy storage device and a second energy storage device to power at least one power consuming component based on identified environmental factors. The method includes, receiving, via a processor, a first temperature value from a temperature sensor, determining if the first temperature value is less than a threshold temperature value, and in response to the first temperature value being less than the threshold temperature value, detecting, via a sensor, which of a first housing and a second housing is being held. The method further includes in response to detecting the first housing is being held, triggering a power source selection circuit to select a first energy storage device to provide power to at least one power consuming component, and transition from drawing power from a second energy storage device.

20 Claims, 11 Drawing Sheets

(52) U.S. Cl.
CPC ...... *H02J 7/0048* (2020.01); *H02J 7/007192* (2020.01); *H02J 7/34* (2013.01)

(56) References Cited

U.S. PATENT DOCUMENTS

2019/0075200 A1* 3/2019 Seo .................. G06F 1/1698
2020/0329435 A1* 10/2020 Lee .................. G06F 1/1698

* cited by examiner

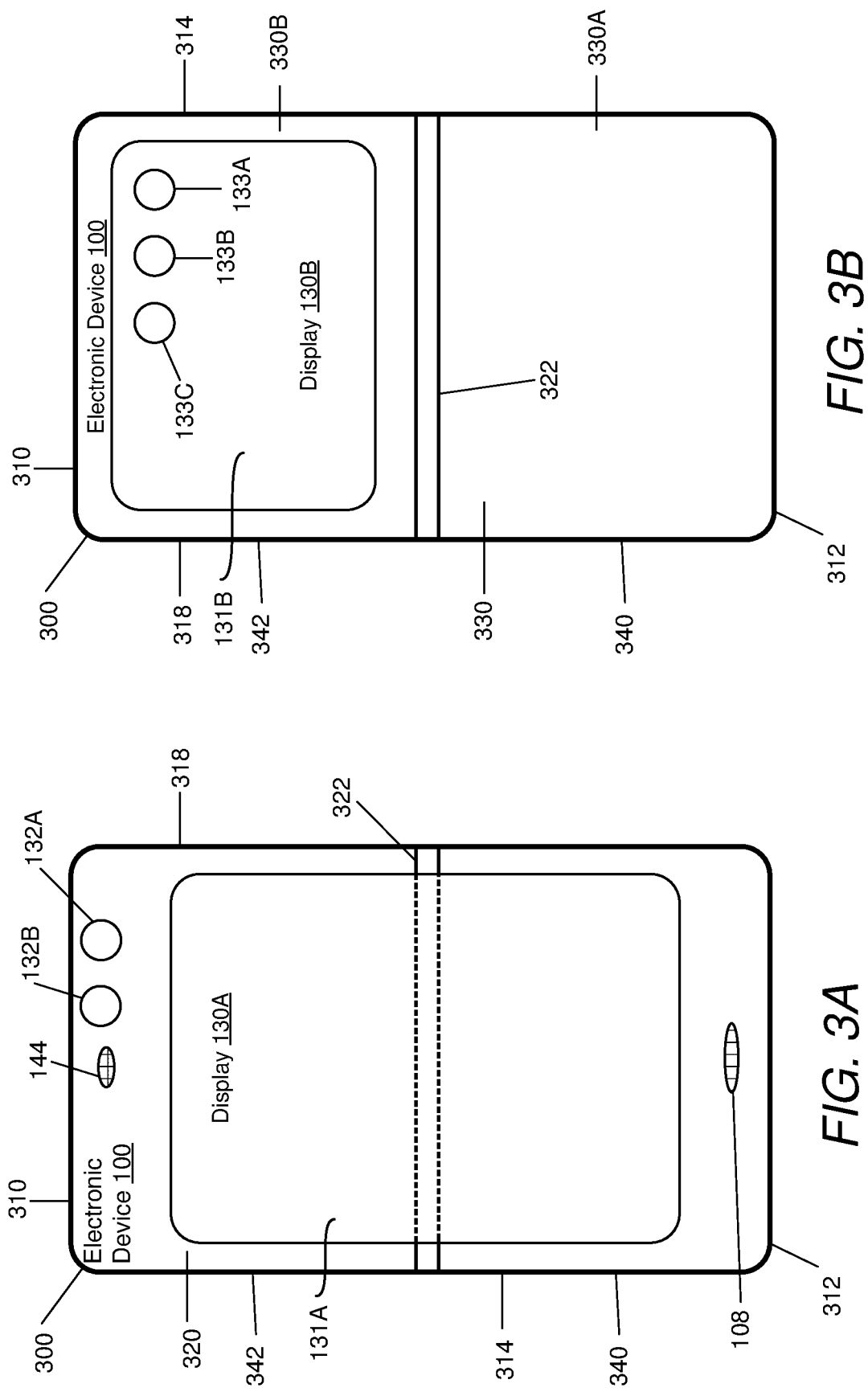

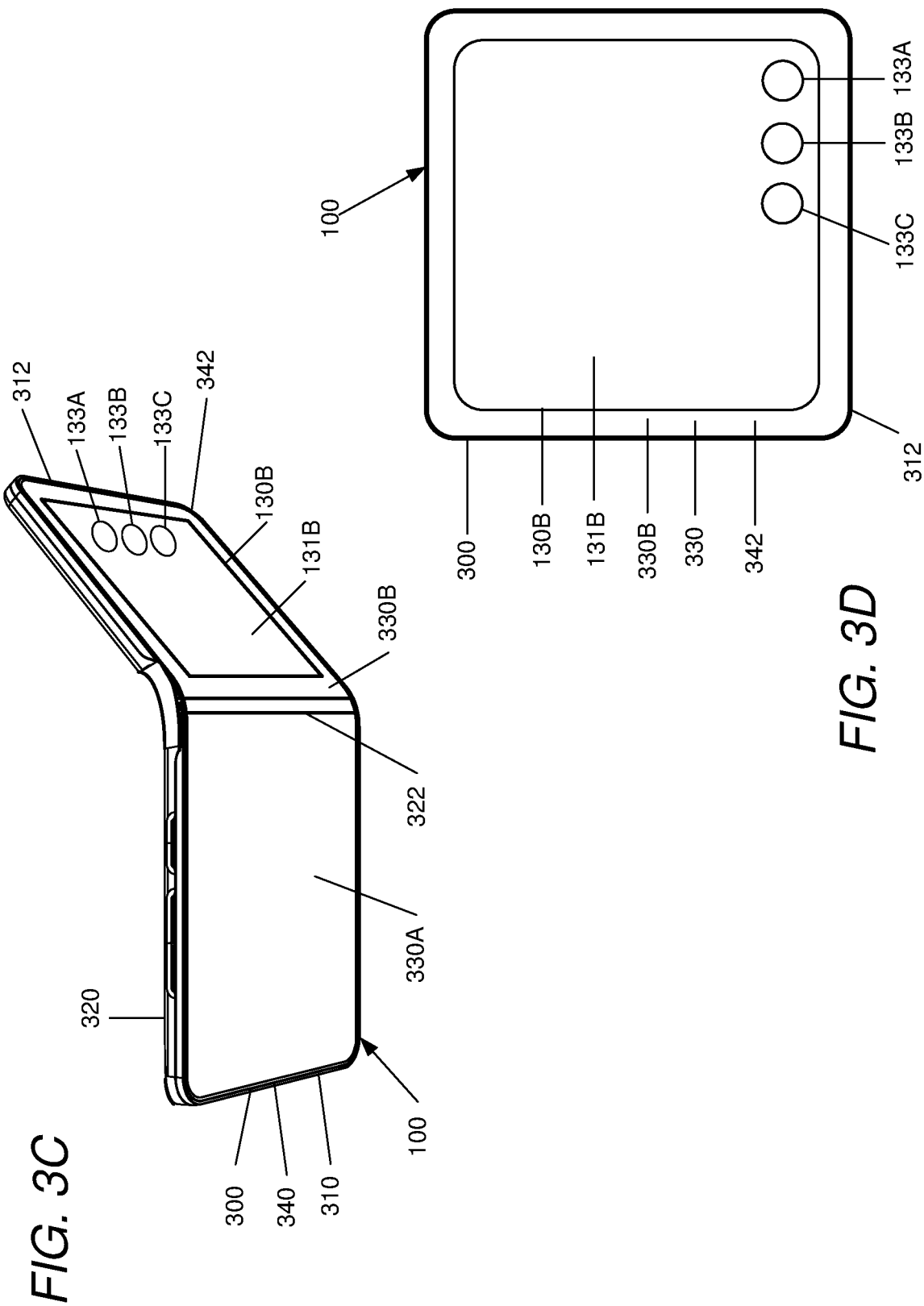

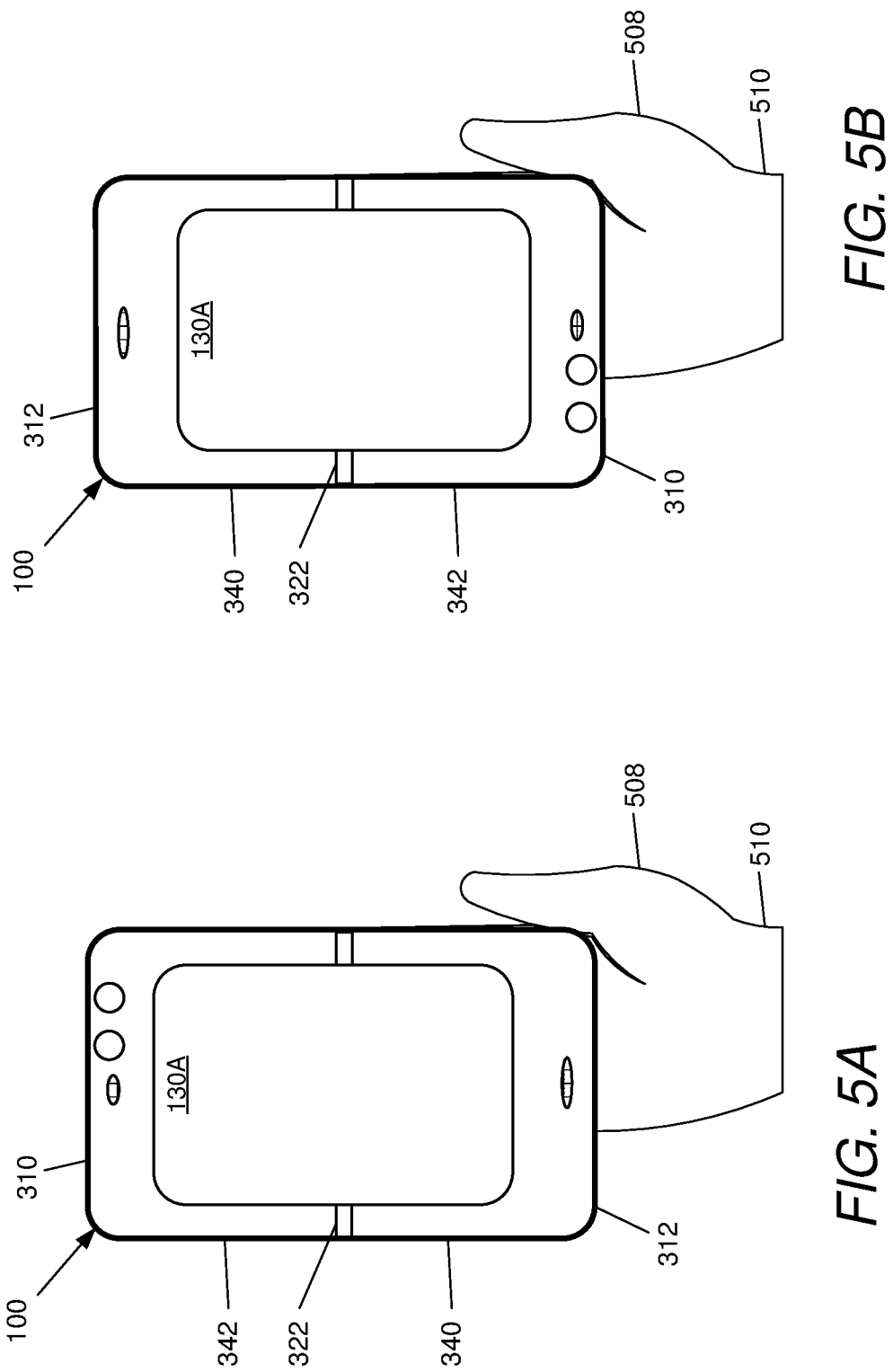

MANAGING MULTIPLE ENERGY STORAGE DEVICES IN AN ELECTRONIC DEVICE BASED ON ENVIRONMENTAL CONDITIONS

PRIORITY APPLICATION

This application claims priority to International Application No. PCT/CN2023/101390, filed Jun. 20, 2023, the contents of which are incorporated herein.

BACKGROUND

1. Technical Field

The present disclosure generally relates to electronic devices with multiple energy storage devices and in particular to hand-held electronic devices with multiple energy storage devices that can individually power the electronic device.

2. Description of the Related Art

Hand-held electronic devices, such as cell phones, tablets, and laptops, are widely used for communication and data transmission in varying types of environmental conditions. These electronic devices support various applications and communication modes, such as computing applications, data transmission, text messaging, audio calling, and video calling. The hand-held electronic devices typically include one or more power sources, such as a battery, that are used to provide power to various components of the electronic device. Unfortunately, many types of batteries do not perform optimally in cold weather. In cold environmental conditions, the performance of the battery can be degraded, resulting in a short battery life and the electronic device shutting down or turning off sooner than desired.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 3A is an example illustration of the front of a foldable electronic device, according to one or more embodiments;

FIG. 3B is an example illustration of the rear of a foldable electronic device, according to one or more embodiments;

FIG. 3C is an example illustration of the electronic device of FIGS. 3A and 3B in a partially folded position, according to one or more embodiments;

FIG. 3D is an example illustration of the electronic device of FIGS. 3A and 3B in a fully folded position, according to one or more embodiments;

FIG. 5A is an example illustration of an electronic device being held by a lower portion of the device housing, according to one or more embodiments;

FIG. 5B is an example illustration of an electronic device being held by an upper portion of the device housing, according to one or more embodiments;

DETAILED DESCRIPTION

Figure 1:
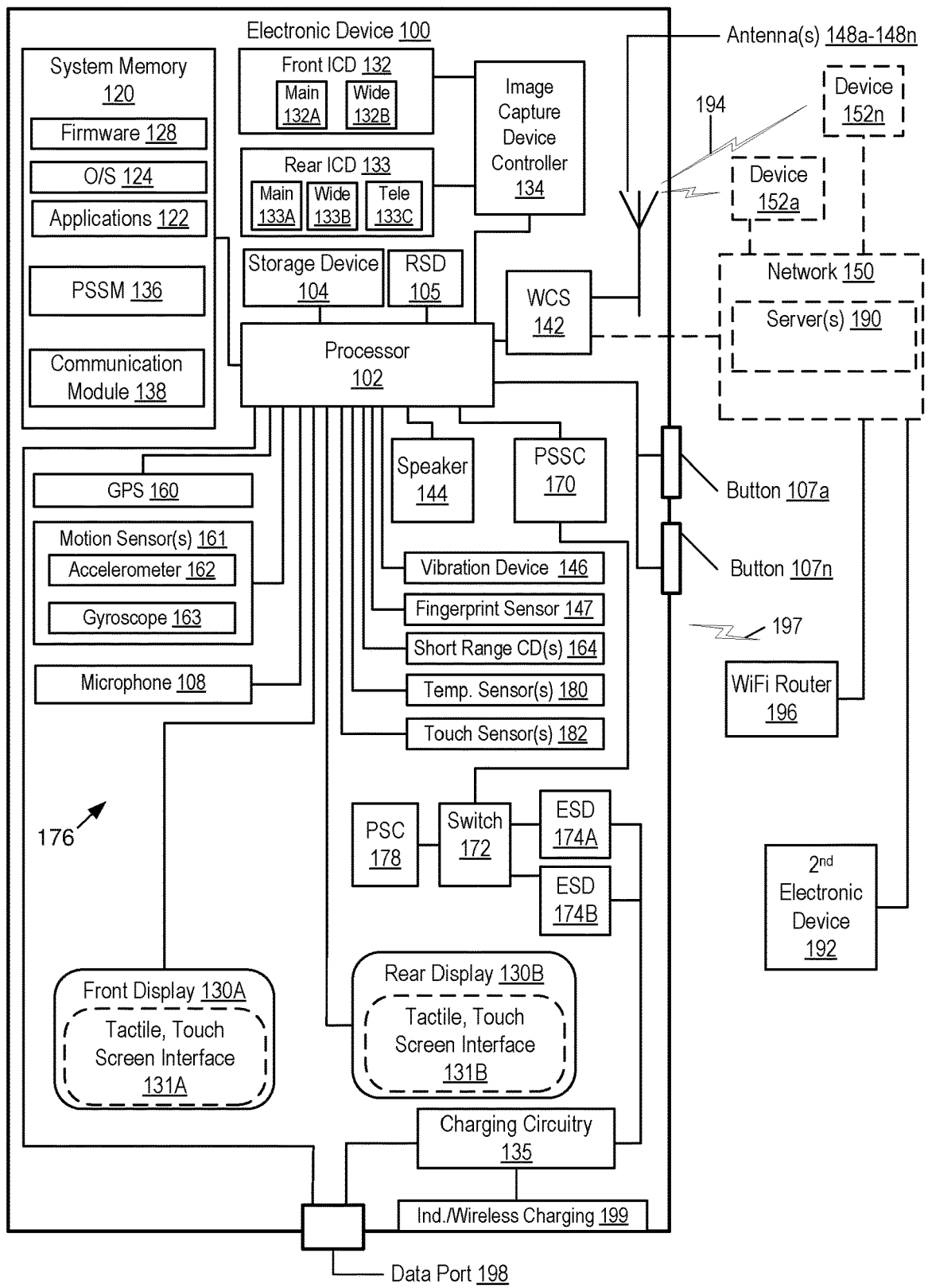
FIG. 1 depicts an example electronic device within which various aspects of the disclosure can be implemented, according to one or more embodiments.

According to one aspect of the disclosure, the illustrative embodiments provide an electronic device, a method, and a computer program product for selecting, based on at least one identified environmental factor, at least one of a first energy storage device and a second energy storage device to power at least one power consuming component. In a first embodiment, an electronic device includes a first housing coupled to a second housing by a hinge, at least one power consuming component disposed within at least one of the first housing and the second housing, and a first energy storage device located in the first housing and selectively supplying power to the at least one power consuming component. The electronic device further includes at least one temperature sensor, at least one second sensor, and a second energy storage device located in the second housing and selectively supplying power to the at least one power consuming component. The electronic device further includes a power source selection circuit comprising a switch that is switchably coupled to one or both of the first energy storage device and the second energy storage device, enabling selective connection of a device power source that comprises one of the first energy storage device, the second energy storage device, or both the first and the second energy storage devices. The electronic device further includes a memory having stored thereon a power source selection module (PSSM) for selecting at least one of the first energy storage device and the second energy storage device to power the at least one power consuming component, based on at least one identified environmental factor. At least one processor is communicatively coupled to the at least one temperature sensor, the at least one second sensor, the power source selection circuit, and to the memory. The at least one processor executes program code of the power source selection module, which enables the electronic device to receive a first temperature value from the at least one temperature sensor and to determine if the first temperature value is less than a threshold temperature value. In response to the first temperature value being less than the threshold temperature value, the at least one processor detects, via the at least one sensor, which of the first housing and the second housing is being held. In response to detecting the first housing is being held, the at least one processor triggers the power source selection circuit to select the first energy storage device to provide power to the at least one power consuming component, and transition from drawing power from the second energy storage device.

According to another embodiment, the method includes, receiving, at a processor, a first temperature value from at least one temperature sensor, determining if the first temperature value is less than a threshold temperature value, and in response to the first temperature value being less than the threshold temperature value, detecting, via at least one sensor, which of a first housing and a second housing is being held. The method further includes in response to detecting the first housing is being held, triggering a power source selection circuit to select a first energy storage device to provide power to at least one power consuming component, and to transition from drawing power from a second energy storage device.

According to an additional embodiment, a computer program product includes a computer readable storage device having stored thereon program code that, when executed by at least one processor of an electronic device having at least one power consuming component, a first energy storage device, a second energy storage device, at least one temperature sensor, at least one second sensor, and a power source selection circuit comprising a switch, enables the electronic device to complete the functionality of the above-described method.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within electronic device 100 (FIG. 1) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 depicts an example electronic device 100 within which various aspects of the disclosure can be implemented, according to one or more embodiments. Examples of such electronic devices include, but are not limited to, mobile devices, a notebook computer, a mobile phone, a digital camera, a smart watch, a tablet computer and a communication device, etc. It is appreciated that electronic device 100 can be other types of devices that include multiple front camera(s) and/or multiple rear camera(s). Electronic device 100 includes processor 102, which is communicatively coupled to storage device 104, system memory 120, input devices (introduced below), output devices, such as displays 130A and 130B, and image capture device (ICD) controller 134. Processor 102 can include processor resources such as a central processing unit (CPU) that support computing, classifying, processing and transmitting of data and information. Processor 102 can further include graphic processing units (GPU) and digital signal processors (DSP) that also support computing, classifying, processing and transmitting of data and information.

According to one or more embodiments, ICD controller 134 performs or supports functions such as, but not limited to, controlling one or more cameras, activating an active camera from among multiple cameras, capturing images and video, adjusting the camera settings and characteristics (shutter speed, f/stop, ISO exposure, zoom control, etc.) of the active camera, etc. ICD controller 134 can perform these functions in response to commands received from processor 102. In one or more embodiments, the functionality of ICD controller 134 is incorporated within processor 102, eliminating the need for a separate ICD controller. For simplicity in describing the features presented herein, the various camera control functions performed by the ICD controller 134 are described as being provided generally by processor 102.

System memory 120 may be a combination of volatile and non-volatile memory, such as random access memory (RAM) and read-only memory (ROM). System memory 120 can store program code or similar data associated with firmware 128, an operating system 124, applications 122, power source selection module (PSSM) 136, and communication module 138. PSSM 136 includes program code that is executed by processor 102 to enable electronic device 100 to select at least one energy storage device to power at least one power consuming component based on at least one identified environmental factor. Communication module 138 includes program code that is executed by processor 102 to enable electronic device 100 to communicate with other external devices and systems.

Although depicted as being separate from applications 122, PSSM 136 and communication module 138 may each be implemented as an application. Processor 102 loads and executes program code stored in system memory 120. Examples of program code that may be loaded and executed by processor 102 include program code associated with applications 122 and program code associated with PSSM 136 and communication module 138.

In one or more embodiments, electronic device includes removable storage device (RSD) 105, which is inserted into an RSD interface (not shown) that is communicatively coupled via system interlink to processor 102. In one or more embodiments, RSD 105 is a non-transitory computer program product or computer readable storage device. RSD 105 may have a version of PSSM 136 stored thereon, in addition to other program code. Processor 102 can access RSD 105 to provision electronic device 100 with program code that, when executed by processor 102, the program code causes or configures electronic device 100 to provide the functionality described herein.

Front display 130A and rear display 130B can be a wide variety of display screens or devices, such as liquid crystal displays (LCD) and an organic light emitting diode (OLED) displays. In one embodiment, front display 130A can be mounted to one side (front) of electronic device 100 and rear display 130B can be mounted to another side (rear) of electronic device 100. In some embodiments, displays 130A and 130B can each be a touch screen device that can receive user tactile/touch input. As a touch screen device, front and rear displays 130A and 130B includes tactile, touch screen interfaces 131A and 131B that allow a user to provide input to or to control electronic device 100 by touching features presented within/below the display screens. Tactile, touch screen interface 131A and 131B can be utilized as an input device.

Throughout the disclosure, the term image capturing device is utilized interchangeably to be synonymous with and/or refer to any one of front or rear cameras 132, 133. Front cameras (or image capture device (ICD)) 132 are communicatively coupled to ICD controller 134, which is communicatively coupled to processor 102. ICD controller 134 supports the processing of signals from front cameras 132. Front cameras 132 can each capture images that are within the field of view (FOV) of the respective image capture device 132. Electronic device 100 includes several front cameras 132. Main front camera 132A is a main camera that captures a standard or regular angle FOV. Wide angle front camera 132B is wide-angle camera that can have a wide angle lens that captures a wide angle FOV. While two front cameras 132A-132B are shown, electronic device 100 can have only one front camera or more than two front cameras.

Electronic device 100 further includes several rear cameras 133. Main rear camera 133A is a main camera that captures a standard or regular angle FOV. Wide angle rear camera 133B is a wide-angle camera that captures a wide angle FOV. Telephoto rear camera 133C is a telephoto camera that captures a telephoto FOV (zoom or magnified). While three rear cameras are shown, electronic device 100 can have less than three rear cameras, such as having two rear cameras or can have more than three rear cameras.

Each front camera 132A and 132B and each rear camera 133A, 133B and 133C is communicatively coupled to ICD controller 134, which is communicatively coupled to processor 102. ICD controller 134 supports the processing of signals from front cameras 132A and 132B and rear cameras 133A, 133B and 133C. Front cameras 132A and 132B can be collectively referred to as front cameras 132, and rear cameras 133A, 133B and 133C can be collectively referred to as rear cameras 133, for simplicity.

Electronic device 100 furthers include data port 198, charging circuitry 135, first energy storage device (ESD) 174A, second ESD 174B, power source selection circuit (PSSC) 170, switch 172 and power supply circuit (PSC) 178. First ESD 174A and second ESD 174B provide power to power consuming components 176 of electronic device 100, such as processor 102, system memory 120, displays 130A. 130B and other components of electronic device 100. In one embodiment, power consuming components 176 comprise all of the components of electronic device 100 except for data port 198, first ESD 174A, and second ESD 174B First ESD 174A and second ESD 174B can each be a rechargeable battery or electrochemical cells formed from materials such as nickel-cadmium (NiCd), nickel-metal hydride (NiMH), lithium-ion (Li-ion), lithium iron phosphate (LiFePO4), and lithium-ion polymer (Li-ion polymer). First ESD 174A and second ESD 174B can also be other types of rechargeable batteries. Charging circuitry 135 is connected between data port 198 and first ESD 174A and second ESD 174B. Charging circuitry 135 can charge first ESD 174A and second ESD 174B when a power input(s) of charging circuit 135 is connected to an external power source via data port 198. Inductive/wireless device 199 is connected to charging circuitry 135. Inductive/wireless device 199 can supply power to charging circuit 135 when inductive/wireless device 199 is placed in proximity to an external inductive charging coil/pad.

PSSC 170 is communicatively coupled to processor 102 and to switch 172. Switch 172 is connected to charging circuitry 135. Switch 172 is switchably coupled to first ESD 174A and second ESD 174B enabling selective connection of at least one of first ESD 174A and second ESD 174B or both of first ESD 174A and second ESD 174B to power components 176 of electronic device 100. PSC 178 is connected to switch 172. PSC 178 regulates power to power consuming components 176 of electronic device 100. PSSC 170 can control the operation of switch 172 to selectively connect at least one of first ESD 174A and second ESD 174B or both of first ESD 174A and second ESD 174B to PSC 178.

Electronic device 100 further includes microphone 108, one or more output devices, such as speakers 144, and one or more input buttons 107a-107n. Input buttons 107a-107n may provide controls for volume, power, and image capture devices 132, 133. Microphone 108 can also be referred to as audio input device 108. Microphone 108 and input buttons 107a-n can also be referred to generally as input devices.

Electronic device 100 further includes wireless communication subsystem (WCS) 142, which is coupled to antennas 148a-148n. In one or more embodiments, WCS 142 can include a communication module with one or more baseband processors or digital signal processors, one or more modems, and a radio frequency front end having one or more transmitters and one or more receivers. Wireless communication subsystem (WCS) 142 and antennas 148a-148n allow electronic device 100 to communicate wirelessly with wireless network 150 via transmissions of communication signals 194 to and from network communication devices 152a-152n, such as base stations or cellular nodes, of wireless network 150. In one embodiment, communication network devices 152a-152n contain electronic communication equipment to allow communication with electronic device 100. Wireless network 150 further allows electronic device to wirelessly communicate with second electronic device 192, which can be similarly connected to wireless network 150 via one of network communication devices 152a-152n Wireless network 150 is communicatively coupled to wireless fidelity (WiFi) router 196. Electronic device 100 can also communicate wirelessly with wireless network 150 via communication signals 197 transmitted by short range communication device(s) 164 to and from WiFi router 196, which is communicatively connected to network 150. In one or more embodiments, wireless network 150 can include one or more servers 190 that support exchange of wireless data and video and other communication between electronic device 100 and second electronic device 192.

Electronic device 100 further includes short range communication device(s) 164. Short range communication device(s) 164 is a low powered transceiver that can wirelessly communicate with other devices. Short range communication device(s) 164 can include one or more of a variety of devices, such as a near field communication (NFC) device, a Bluetooth device, and/or a wireless fidelity (Wi-Fi) device. Short range communication device(s) 164 can wirelessly communicate with WiFi router 196 via communication signals 197. In one embodiment, electronic device 100 can communicate with WiFi router 196 wirelessly via short range communication device 164. In an embodiment, WCS 142, antennas 148a-148n and short-range communication device(s) 164 collectively provide communication interface(s) of electronic device 100. These communication interfaces enable electronic device 100 to communicatively connect to at least one second electronic device 192 via at least one network.

Electronic device 100 further includes vibration device 146, fingerprint sensor 147, global positioning system (GPS) device 160, and motion sensor(s) 161. Vibration device 146 can cause electronic device 100 to vibrate or shake when activated. Vibration device 146 can be activated during an incoming call or message in order to provide an alert or notification to a user of electronic device 100. Front and rear displays 130A. 130B, speakers 144, and vibration device 146 can generally and collectively be referred to as output devices.

Fingerprint sensor 147 can be used to provide biometric data to identify or authenticate a user. GPS device 160 can provide time data and location data about the physical location of electronic device 100 using geospatial input received from GPS satellites. In one embodiment, the time data and location data can be utilized by processor 102 in determining a current context of a communication.

Motion sensor(s) 161 can include one or more accelerometers 162 and gyroscope 163. Motion sensor(s) 161 can detect movement of electronic device 100 and provide motion data to processor 102 indicating the spatial orientation and movement of electronic device 100. Accelerometers 162 measure linear acceleration of movement of electronic device 100 in multiple axes (X, Y and Z). For example, accelerometers 162 can include three accelerometers, where one accelerometer measures linear acceleration in the X axis, one accelerometer measures linear acceleration in the Y axis, and one accelerometer measures linear acceleration in the Z axis. Gyroscope 163 measures rotation or angular rotational velocity of electronic device 100.

Electronic device 100 further includes temperature sensors 180 and touch sensors 182. One or more temperature sensors 180 can be mounted to various locations on or within a housing of electronic device 100. In one embodiment, a different temperature sensor can be positioned proximate to each of first ESD 174A and second ESD 174B to monitor the temperature of each ESD. In another embodiment, several temperature sensors can be positioned on a housing of electronic device 100 to sense a temperature of the environment surrounding electronic device 100.

One or more touch sensors 182 can be mounted to various locations on or within a housing of electronic device 100. Touch sensors 182 can be a wide variety of touch sensor types including capacitive touch sensors, resistive touch sensors, infrared touch sensors, and other touch sensors. Touch sensors 182 are used to identify how and where on housing, a user of electronic device 100 is holding the electronic device.

In the description of each of the following figures, reference is also made to specific components illustrated within the preceding figure(s). Similar components are presented with the same reference number.

Figure 2:
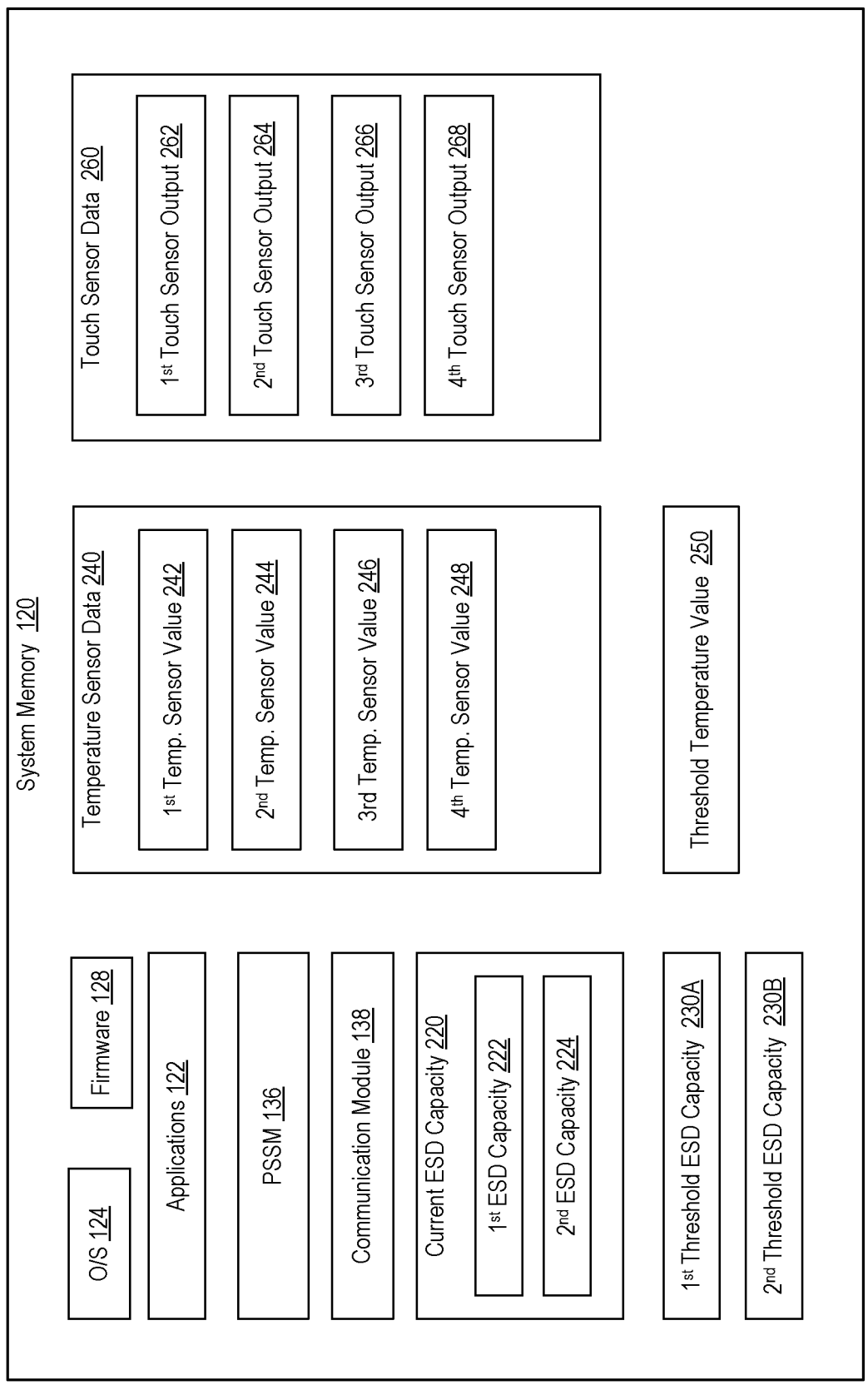
FIG. 2 is a block diagram of example contents of the system memory of the example electronic device of FIG. 1, according to one or more embodiments.

Referring to FIG. 2, there is shown one embodiment of example contents of system memory 120 of electronic device 100. System memory 120 includes data, software, and/or firmware modules, including applications 122, operating system 124, firmware 128, PSSM 136, and communication module 138.

PSSM 136 includes program code that is executed by processor 102 to enable electronic device 100 to perform the various features of the present disclosure. In one or more embodiments, PSSM 136 includes program code that is executed by processor 102 to enable electronic device 100 to select at least one energy storage device to power at least one power consuming component based on at least one identified environmental factor. In one or more embodiments, execution of PSSM 136 by processor 102 enables/configures electronic device 100 to perform the processes presented in the flowchart of FIGS. 7A-7D, as will be described below.

Communication module 138 enables electronic device 100 to communicate with wireless network 150 and with other devices, such as second electronic device 192, via one or more of audio, text, and video communications.

System memory 120 further includes current ESD capacity 220, first threshold ESD capacity 230A, and second threshold ESD capacity 230B. Current ESD capacity 220 contains the current energy capacity of each of first and second ESD 174A and 174B. In one embodiment, the current energy capacity can be measured in amp-hours or watt-hours. In another embodiment, the current energy capacity can be measured as a percentage of a full charge capacity. Current ESD capacity 220 includes first ESD capacity 222 corresponding to the current energy capacity of first ESD 174A and second ESD capacity 224 corresponding to the current energy capacity of second ESD 174B. In one embodiment, electronic device 100 can track the first ESD capacity 222 and second ESD capacity 224 during operation of electronic device 100. First threshold ESD capacity 230A is a pre-defined minimum ESD capacity for first ESD 174A and second threshold ESD capacity 230B is a pre-defined minimum ESD capacity for second ESD 174B.

System memory 120 further includes temperature sensor data 240 and threshold temperature value 250. Temperature sensor data 240 is received as an output from each of a corresponding respective temperature sensor 180. Temperature sensor data 240 comprises first temperature sensor value 242, second temperature sensor value 244, third temperature sensor value 246, and fourth temperature sensor value 248. Threshold temperature value 250 is a pre-defined minimum temperature value for temperatures sensed by temperature sensors 180. In one embodiment, threshold temperature value 250 can be zero degrees Centigrade. In one embodiment, a different threshold temperature value 250 can be associated with different temperature sensors.

System memory 120 further includes touch sensor data 260. Touch sensor data 260 is received as an output from each of a corresponding respective touch sensor 182. Touch sensor data 260 can be are used to identify how and where on housing, a user of electronic device 100 is holding the electronic device. In an embodiment electronic device 100 can have four touch sensors 182, with each touch sensor providing a sensor output. In one embodiment, touch sensor data 260 can include first touch sensor output 262 from a first touch sensor, second touch sensor output 264 from a second touch sensor, third touch sensor output 266 from a third touch sensor, and fourth touch sensor output 268 from a fourth touch sensor.

Turning to FIG. 3A, which shows details of the front surface of electronic device 100. In one embodiment, electronic device 100 can be a foldable electronic device. In FIG. 3A, electronic device 100 is shown in a fully open position. Electronic device 100 includes a housing 300 that contains the components of electronic device 100. Housing 300 includes a top 310, bottom 312, and opposed first side 314 and second side 318. Housing 300 further includes a front surface 320, a hinge section 322, lower portion 340 and upper portion 342. Hinge section 322 rotatably connects lower portion 340 to upper portion 342. Lower portion 340 and upper portion 342 can rotate about hinge section 322. Lower portion 340 and upper portion 342 can also be referred to respectively as first housing 340 and second housing 342, given that housing 300 is composed of the two separated portions (340, 342) interconnected by hinge section 322. Display 130A extends across first housing 340, second housing 342 and hinge section 322 forming front surface 320. In addition to display 130A, front surface 320 of electronic device 100 presents microphone 108, main front camera 132A, wide angle front camera 132B, and speaker 144.

With additional reference to FIG. 3B, additional details of the rear surface of electronic device 100 are shown. In FIG. 3B, electronic device 100 is shown in a fully open position. Housing 300 further includes a rear surface 330 including first rear surface 330A of first housing 340 and second rear surface 330B of second housing 342 that are separated by hinge section 322. Disposed on/at upper rear surface 330B of electronic device 100 are rear display 130B, main rear camera 133A, wide angle rear camera 133B, and telephoto rear camera 133C. In the illustrative embodiment, rear display 130B occupies only upper rear surface 330B.

Referring to FIG. 3C, electronic device 100 is shown in a partially folded position. Display 130A can be formed from flexible materials that allow electronic device 100 to be folded. Electronic device 100 can be folded by moving first housing 340 and second housing 342 of electronic device 100 toward each other about hinge section 322. As electronic device 100 is folded, opposing portions of display 130A (FIG. 3A) face each other.

Turning to FIG. 3D, details of electronic device 100 in a fully folded position are shown. After electronic device 100 has been folded, rear surface 330 presents as an outer surface of electronic device 100. Second rear surface 330B outwardly presents rear display 130B and rear cameras 133A-132C, which remain accessible for viewing and use.

Figure 4:
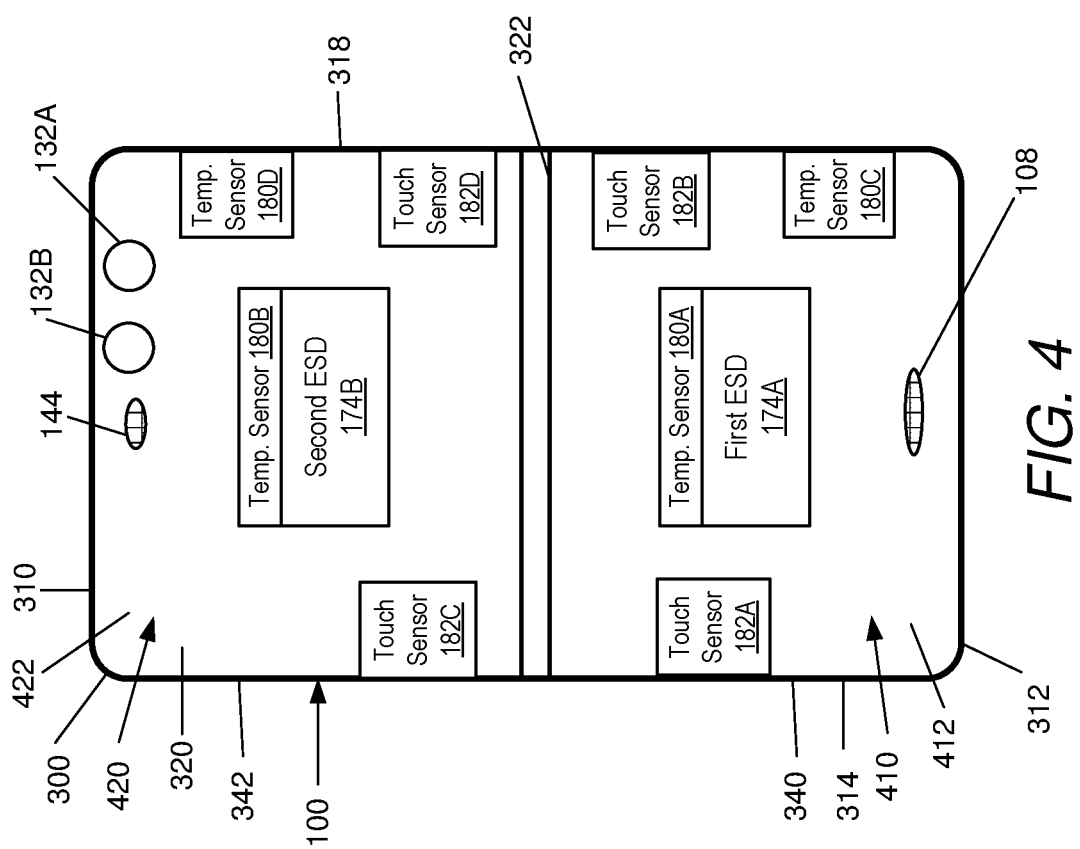
FIG. 4 is an example illustration of a front view of a foldable electronic device with a display surface(s) removed exposing a portion of the internal components of the electronic device, according to one or more embodiments.

With reference to FIG. 4, a front view of electronic device 100 is illustrated with front surface comprised primarily of display 130A removed to show some of the interior components of electronic device 100. First housing 340 includes a first cavity 410 with an inner rear surface 412 and second housing 342 includes a second cavity 420 with an inner rear surface 422. Components of electronic device 100 are mounted in cavities 410 and 420. First ESD 174A is mounted in first housing 340 and second ESD 174B is mounted in second housing 342. The components can be mounted on circuit boards, in one embodiment.

Temperature sensor 180A is mounted proximate to first ESD 174A in first housing 340 and temperature sensor 180B is mounted proximate to second ESD 174B in second housing 342. Temperature sensor 180A can detect and monitor the temperature of first ESD 174A, and temperature sensor 180B can detect and monitor the temperature of second ESD 174B. Temperature sensor 180C is mounted proximate to second side 318 in first housing 340 and temperature sensor 180D is mounted proximate to second side 318 in second housing 342. Temperature sensor 180C can detect and monitor the temperature of the environment surrounding first housing 340 and temperature sensor 180B can detect and monitor the temperature of the environment surrounding second housing 342. Temperature sensor 180C can be mounted to other positions within first housing 340. In one embodiment, temperature sensor 180C can be mounted proximate to bottom 312 or first side 314. Temperature sensor 180D can be mounted to other positions within second housing 342. In another embodiment, temperature sensor 180D can be mounted proximate to top 310 or first side 314.

According to one aspect of the disclosure, any one or more than one of temperature sensors 180A, 180B, 180C, and 180D can be used to monitor the temperature of the environment surrounding electronic device 100. In one embodiment, the temperatures sensed by temperature sensors 180A, 180B, 180C, and 180D can be averaged to obtain an average temperature of the environment surrounding electronic device 100.

Touch sensor 182A is mounted proximate to first side 314 in first housing 340, and touch sensor 182B is mounted proximate to second side 318 in first housing 340. Touch sensors 182A and 182B can detect and monitor if first housing 340 is being touched or held by an electronic device user. Touch sensor 182C is mounted proximate to first side 314 in second housing 342, and touch sensor 182D is mounted proximate to second side 318 in second housing 342. Touch sensors 182C and 182D can detect and monitor if second housing 342 is being touched or held by an electronic device user. Touch sensor 182C can be mounted to other positions within first housing 340 and touch sensor 182D can be mounted to other positions within second housing 342.

Referring to FIG. 5A, electronic device 100 is shown being held by the hand 508 of an electronic device user 510. More specifically, electronic device user 510 is holding electronic device 100 by first housing 340.

According to one aspect of the disclosure, PSSM 136 enables electronic device 100 to receive, via processor 102 a temperature value 248 from at least one temperature sensor (e.g., temperature sensor 180D). Electronic device 100 determines if the temperature value 248 is less than a threshold temperature value 250. In response to the temperature value 248 being less than the threshold temperature value 250, electronic device 100 detects, via at least one touch sensor (e.g., touch sensor 182B), which of the first housing 340 and second housing 342 is being held. In response to detecting the first housing 340 is being held, electronic device 100 triggers a power source selection circuit 170 to select first ESD 174A within the first housing to provide power to at least one power consuming component 176 and transition from drawing power from second ESD 174B within the second housing that is not being held.

Powering electronic device 100 using first ESD 174A that is in the first housing 340 being held by the electronic device user 510 allows the first ESD 174A to be more isolated from the (below threshold) cold exterior environment of first housing 340 because of the presence of the user's hand to shield the surface from the exterior temperature and/or to provide a source of body heat. This selection of first ESD 174A enables first ESD 174A to operate in a higher working temperature range, which is a preferred operating condition to operating within the lower exterior temperature. Operating first ESD 174A in a preferred working temperature range minimizes any shutdowns of electronic device 100 that would otherwise occur due to faster onset of low battery charge conditions. The discharge time for operation of first ESD 174A is improved by at least partially covering the first ESD 174A by hand 508 during the operation of electronic device 100. Additionally, by not utilizing the second ESD 174B in the lower temperatures preserves the discharge time of second ESD 174B.

Referring to FIG. 5B, electronic device 100 is shown being held by the hand 508 of an electronic device user 510. More specifically, electronic device user 510 is holding electronic device 100 by second housing 342.

According to another aspect of the disclosure, PSSM 136 enables electronic device 100, in response to detecting that the second housing 342 is being held, while the device temperature is below the optimal operating range of temperatures for the first and second ESDs 174A-174B, trigger power source selection circuit 170 to select the second ESD 174B to provide power to at least one power consuming component 176 and to transition from drawing power from the first ESD 174A.

Figure 6B:
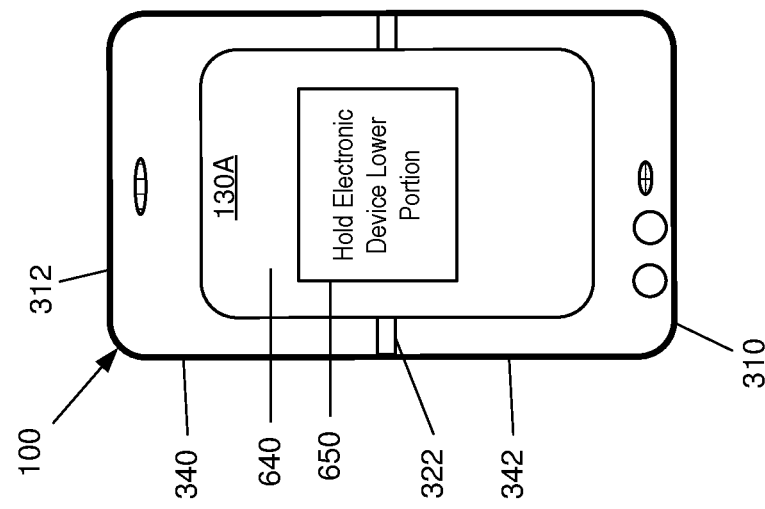
FIG. 6B illustrates content presented on a display of the electronic device of FIG. 5A, oriented upside-down relative to a top section of the device housing to cause the user to pick up and hold the electronic device at the top section of the device housing, in order to improve the operating life of an energy storage device, according to one or more embodiments.
Figure 6A:
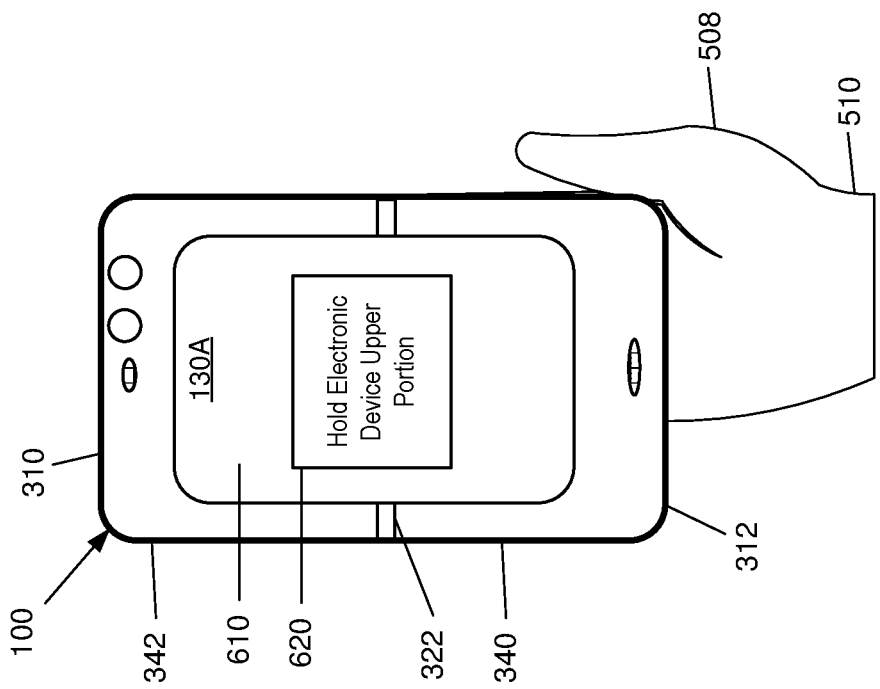
FIG. 6A illustrates content presented on a display of the electronic device of FIG. 5A, while the device is being held, to advise a device user on how the electronic device is to be held, in order to improve the operating life of an energy storage device, according to one or more embodiments.

With reference now to FIG. 6A, electronic device 100 is illustrated with an example graphical user interface (GUI) 610 presented on display 130A. GUI 610 includes a message 620 that instructs the electronic device user how to hold electronic device 100 in order to optimize the operating life of first ESD 174A and second ESD 174B. In FIG. 6A, electronic device 100 is shown being held by the hand 508 of an electronic device user 510. More specifically, electronic device user 510 is holding electronic device 100 by lower portion or first housing 340.

According to an additional aspect of the disclosure, PSSM 136 enables electronic device 100 to determine if a first remaining capacity 222 of the first ESD 174A is less than a first threshold ESD capacity 230A. In response to the first remaining capacity 222 of first ESD 174A being less than first threshold ESD capacity 230A, electronic device 100 identifies if a second remaining capacity 224 of second ESD 174B is greater than the first remaining capacity 222. In response to identifying that the second remaining capacity 224 of second ESD 174B is greater than the first remaining capacity 222, electronic device 100 generates a GUI 610 that contains a first message 620 indicating that the user should change from holding of the electronic device at the first housing or lower portion 340 to holding the device via the second housing or upper portion 342. Electronic device 100 presents GUI 610 containing the first message 620 on display 130A.

Turning to FIG. 6B, electronic device 100 is illustrated with an example graphical user interface (GUI) 640 presented on display 130A. In FIG. 6A, electronic device 100 is not being held by an electronic device user. GUI 640 includes a message 650 that instructs the electronic device user how to hold electronic device 100 in order to optimize the operating life of ESD first 174A and second ESD 174B. According to the illustrative embodiment, the message 650 within GUI is oriented to be read with the device 100 being held via the second housing or upper portion 342.

According to another aspect of the disclosure, PSSM 136 enables electronic device 100 to detect if both the first housing or lower portion 340 and the second housing or upper portion 342 are not being held. In response to detecting that both the first housing or lower portion 340 and the second housing or upper portion 342 are not being held, electronic device 100 generates a GUI 640 that contains a second message 650 indicating how a user is to hold the electronic device 100 based on ESD capacity and/or temperature and presents GUI 640 containing the second message 650 on display 130A. For example, electronic device 100 may determine that the second ESD 174B has a larger remaining charge than the first ESD 174A and determine to present second message 650 rather than first message 620 on GUI 640. As another example, electronic device 100 may determine that first ESD 174A is more susceptible to degradation under low temperature conditions that second ESD 174B and thus should not be used during such conditions while second ESD 174B has sufficient (i.e., above a minimum threshold) amount of charge remaining.

FIGS. 7A-7D depict method 700 by which electronic device 100 selects at least one of a first energy storage device and a second energy storage device to power at least one power consuming component based on at least one identified environmental factor. The description of method 700 will be described with reference to the components and examples of FIGS. 1-6B.

The operations depicted in FIGS. 7A-7D can be performed by electronic device 100 or any suitable electronic device that includes the one or more functional components of electronic device 100 that provide/enable the described features. One or more of the processes of the methods described in FIGS. 7A-7D may be performed by processor 102 executing program code associated with PSSM 136. In one embodiment, PSSC 170 controls switch 172 to switch a source of power being supplied to power consuming components between first ESD 174A and second ESD 174B, based on detecting which housing was being held by the device user and an amount of charge remaining in each of the two ESDs 174A-174B.

Figure 7A:
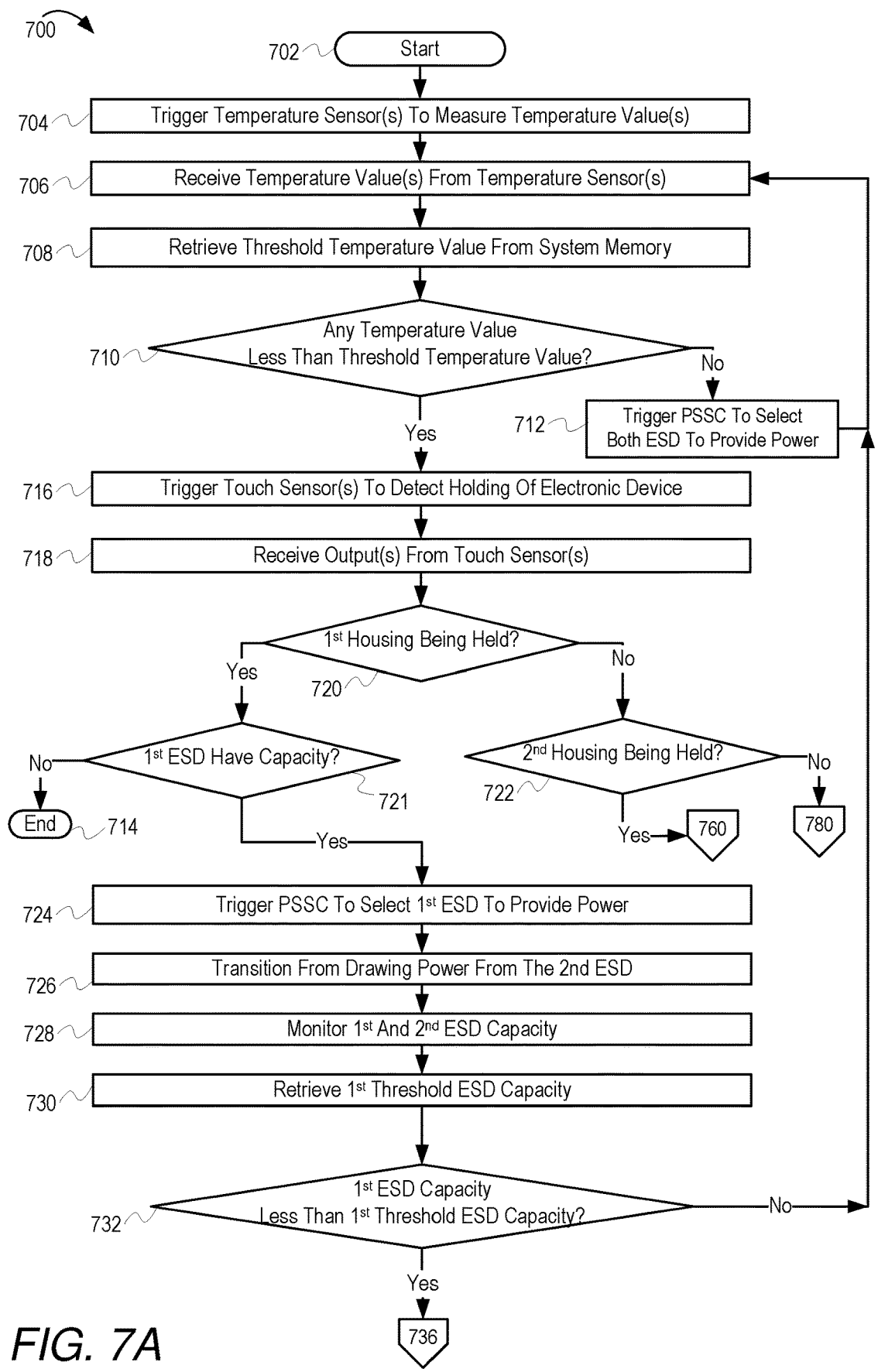
FIGS. 7A-7D depicts a flowchart of a method by which an electronic device selects an energy storage device to provide power to power consuming components of the electronic device based on environmental factors, and directs a user how to hold the electronic device to improve the operating life of an energy storage device, according to one or more embodiments.

With specific reference to FIG. 7A, method 700 begins at the start block 702. At block 704, processor 102 triggers at least one of the temperature sensors (e.g., temperature sensor 180C) to measure at least one temperature value (e.g., third temperature sensor value 246). Processor 102 receives the at least one temperature value (e.g., third temperature sensor value 246) from at least one of the temperature sensors (e.g., temperature sensor 180C) (block 706). In one embodiment, processor 102 can receive temperature values from each of the temperature sensors 180A-180D. In another embodiment, processor 102 can calculate an average temperature value from all of the temperature values that are received. Temperature sensors 180A-180D sense temperature that is substantially representative of the environment that surrounds electronic device 100 and experienced by respective ones of first ESD 174A and second ESD 174B.

Processor 102 retrieves corresponding threshold temperature value(s) 250 from system memory 120 (block 708). Processor 102 determines if any of the received temperature sensor values (e.g., third temperature sensor value 246) are less than corresponding respective threshold temperature value(s) 250 (decision block 710). In response to none of the received temperature sensor values being less than threshold temperature value 250, processor 102 triggers PSSC 170 to power electronic device 100 from both the first ESD 174A second ESD 174B (block 712) or via a power supply sharing scheme utilized as a default/standard powering scheme by the PSSC 170. Method 700 returns to block 706.

In response to at least one of the received temperature sensor values being less than threshold temperature value 250, processor 102 triggers the touch sensors 182A-182D to detect if the touch sensors are being touched and to generate respective corresponding touch sensor outputs 262, 264, 266, and 268 (block 716). Processor 102 receives the touch sensor outputs 262, 264, 266, and 268 from the touch sensors 182A-182D (block 718).

Processor 102 determines if the first housing 340 or second housing 342 is being held based on the touch sensor outputs 262, 264, 266, and 268 received from touch sensors 182A-182D (decision block 720). In response to determining that first housing 340 is being held, processor 102 determines if first ESD 174A has sufficient capacity to provide power to power consuming components 176 (decision block 721). In response to determining that first ESD 174A does not have sufficient capacity to provide power to power consuming components 176, method 700 ends at end block 714. In response to determining that first ESD 174A has sufficient capacity to provide power to power consuming components 176, processor 102 triggers PSSC 170 to select first ESD 174A to provide power to at least one power consuming component 176 of electronic device 100 (block

724). Additionally, if second ESD 174B was being used to power the power consuming device, processor 102 triggers PSSC 170 to transition from drawing power from second ESD 174B (block 726) in order to reduce the rate of drain of charge from second ESD 174B which is exposed to the lower ambient temperature values below the temperature threshold value.

Processor 102 monitors the first remaining capacity 222 of first ESD 174A and the second remaining capacity 224 of second ESD 174B (block 728). Processor 102 retrieves first threshold ESD capacity 230A from system memory 120 (block 730). Processor 102 determines if the first capacity 222 of ESD 174A is less than the first threshold ESD capacity 230A (decision block 732). In response to determining that the first capacity 222 of ESD 174A is not less than the first threshold ESD capacity 230A, processor 102 returns to block 706 to continue monitoring the temperature values.

Figure 7B:
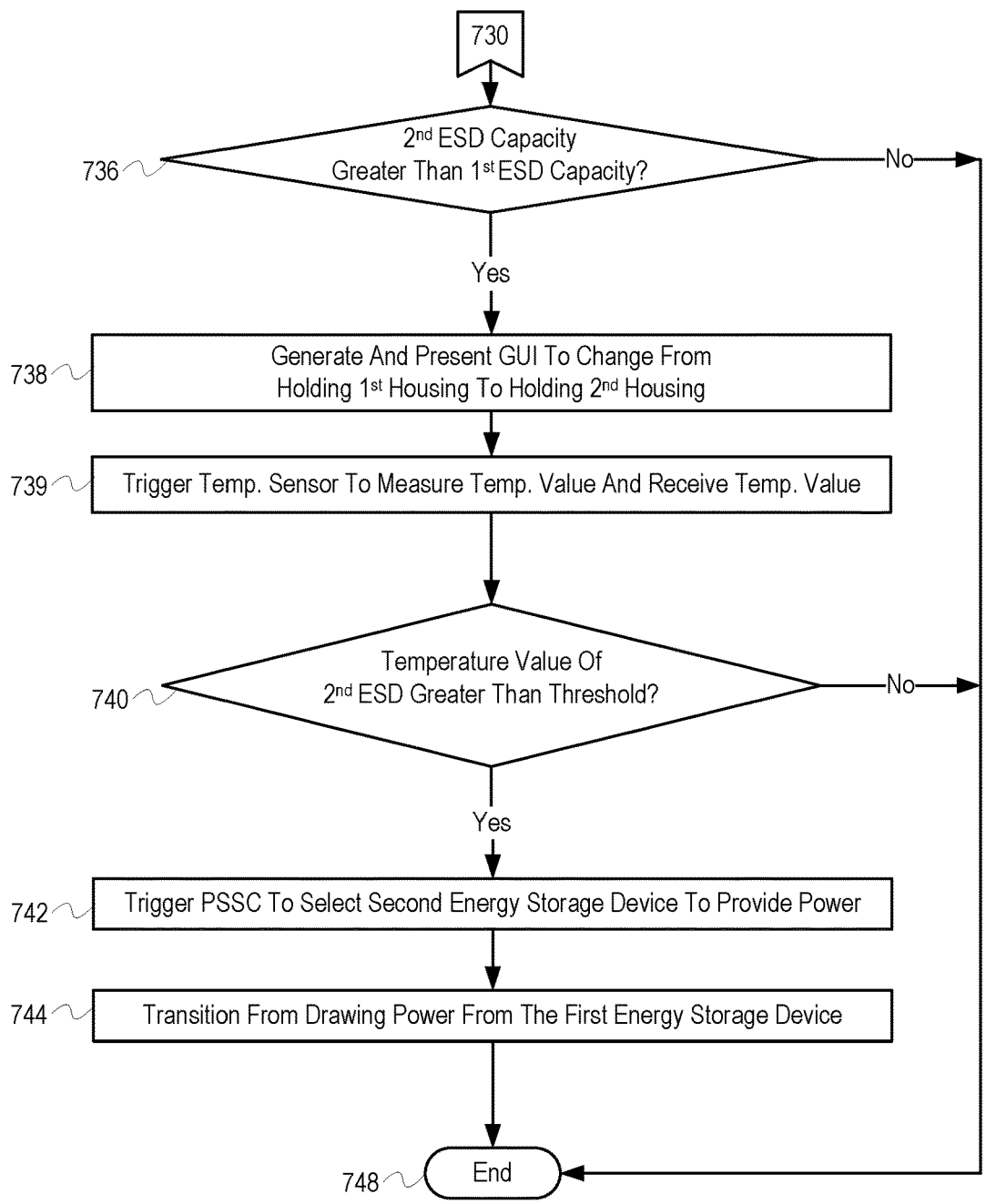

In response to determining that the first capacity 222 of first ESD 174A is less than the first threshold ESD capacity 230A, method 700 continues with block 736 of FIG. 7B. Turning to FIG. 7B, processor 102 determines if the second capacity 224 of second ESD 174B is greater than the first capacity 222 of first ESD 174A (decision block 736). In response to determining that the second capacity 224 of ESD 174B is not greater than the first capacity 222 of ESD 174A, method 700 terminates at end block 748.

In response to determining that the second capacity 224 of ESD 174B is greater than the first capacity 222 of ESD 174A, processor 102 generates GUI 610 that contains a first message 620 indicating that the user should change from holding the electronic device by the first housing or lower portion 340 to holding the electronic device by the second housing or upper portion 342, and processor 102 presents GUI 610 containing the first message 620 on display 130A (block 738).

Processor 102 triggers temperature sensor 180B to measure second temperature sensor value 244 and receives second temperature sensor value 244 (block 739). Processor 102 determines if the second temperature sensor value 244 from temperature sensor 180B is greater than threshold temperature value 250 (decision block 740). In response to the second temperature sensor value 244 not being greater than threshold temperature value 250, processor 102 continues to draw power from first ESD 174A and method 700 terminates at end block 748.

In response to the second temperature sensor temperature value 244 being greater than threshold temperature value 250, while the first temperature value 242 is below the threshold temperature value 250 established for the first temperature sensor, processor 102 triggers PSSC 170 to select second ESD 174B to provide power to at least one power consuming component 176 of electronic device 100 (block 742) and to transition from drawing power from first ESD 174A (block 744). Method 700 ends at end block 748.

Referring back to FIG. 7A. In response to determining that first housing 340 is not being held (decision block 720), processor 102 determines if second housing 342 is being held based on the touch sensor outputs 262, 264, 266, and 268 received from touch sensors 182A-182D (decision block 722). In response to determining that second housing 342 is being held, processor 102 triggers PSSC 170 to select second ESD 174B to provide power to at least one power consuming component 176 of electronic device 100 (block 760 of FIG. 7C).

Figure 7C:
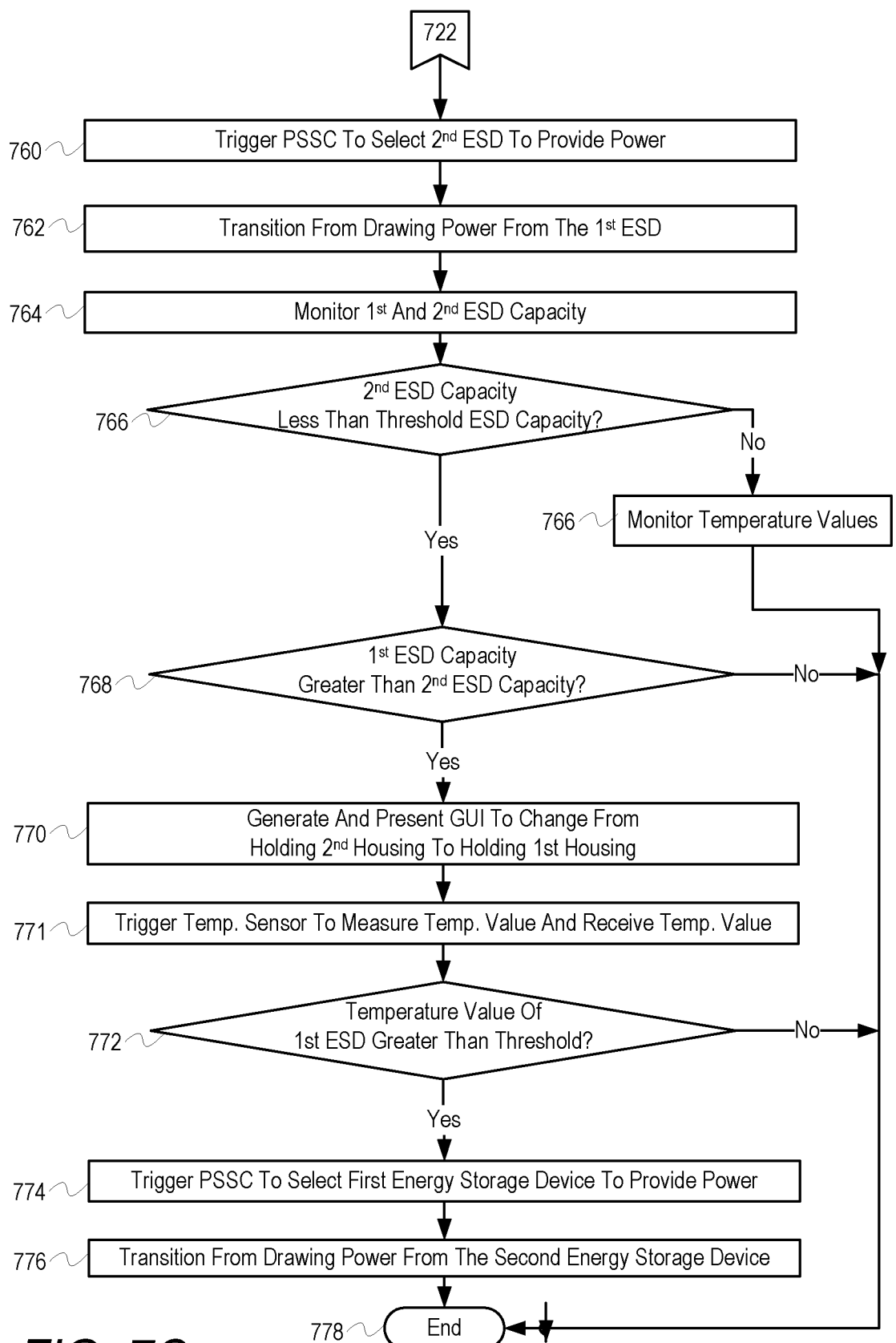

With reference to FIG. 7C, if the electronic device was being powered by first ESD 174A, processor 102 transitions from drawing power from first ESD 174A (block 762). Processor 102 monitors the first capacity 222 of ESD 174A and the second capacity 224 of ESD 174B (block 764). Processor 102 determines if the second capacity 224 of ESD 174B is less than the second threshold ESD capacity 230B (decision block 766). In response to determining that the second capacity 224 of ESD 174B is not less than the second threshold ESD capacity 230B, processor 102 continues to determine if the second capacity 224 of ESD 174B is less than the second threshold ESD capacity 230B at decision block 766.

In response to determining that the second capacity 224 of ESD 174B is less than the second threshold ESD capacity 230B, processor 102 determines if the first capacity 222 of ESD 174A is greater than the second capacity 224 of ESD 174B (decision block 768). In response to determining that the first capacity 222 of ESD 174A is not greater than the second capacity 224 of ESD 174B, processor 102 monitors the temperature values received from temperature sensors 180A-180D. Method 700 terminates at end block 778.

In response to determining that the first capacity 222 of ESD 174A is greater than the second capacity 224 of ESD 174B, processor 102 generates GUI 640 that contains a second message 650 indicating that the user should change from holding the electronic device by the second housing or upper portion 342 to holding the electronic device by the first housing or lower portion 340, and processor 102 presents GUI 640 containing the second message 650 on display 130A (block 770).

Processor 102 triggers temperature sensor 180A to measure first temperature sensor value 242 and receives first temperature sensor value 242 (block 771). Processor 102 determines if the first temperature sensor temperature value 242 from temperature sensor 180A is greater than threshold temperature value 250 (decision block 772). In response to the first temperature sensor temperature value 242 not being greater than threshold temperature value 250, processor 102 continues to draw power from second ESD 174B and method 700 terminates at end block 778.

In response to the first temperature sensor temperature value 242 being greater than threshold temperature value 250, processor 102 triggers PSSC 170 to select first ESD 174A to provide power to at least one power consuming component 176 of electronic device 100 (block 774). Additionally, if second ESD 174B was being used to power the power consuming device, processor 102 triggers PSSC 170 to transition from drawing power from second ESD 174B (block 776) in order to reduce the rate of drain of charge from second ESD 174B which is exposed to the lower temperature values below the temperature threshold value. Method 700 ends at end block 778.

Figure 7D:
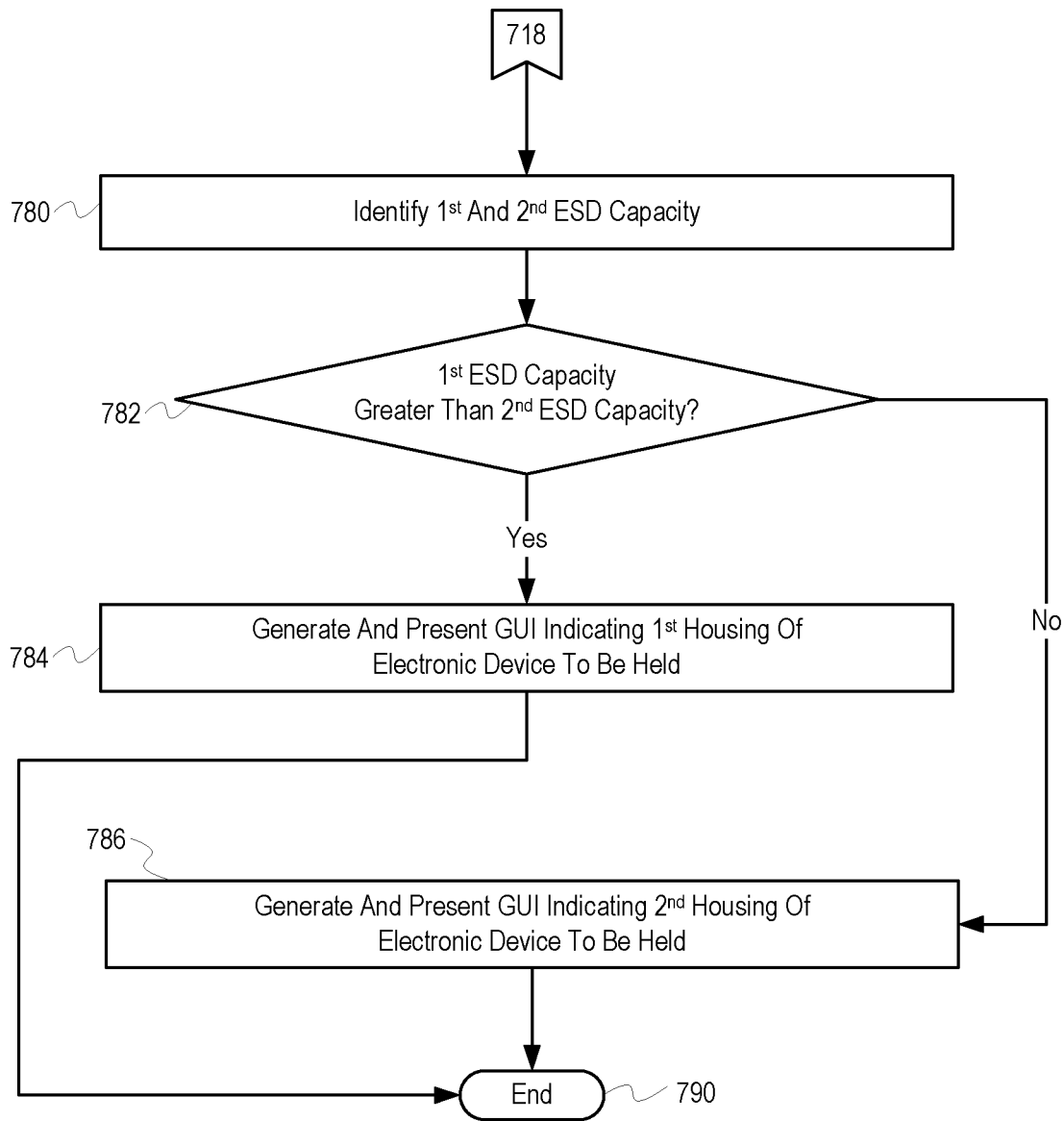

Referring back to FIG. 7A, in response to determining that second housing 342 is not being held (decision block 722), processor 102 identifies the capacity of first ESD 174A and second ESD 174B (block 780 of FIG. 7D).

With reference to FIG. 7D, processor 102 determines if the first capacity 222 of ESD 174A is greater than the second capacity 224 of ESD 174B (decision block 782). In response to determining that the first capacity 222 of ESD 174A is greater than the second capacity 224 of ESD 174B, processor 102 generates GUI 640 that contains a message 650 indicating that electronic device 100 be held by first housing or lower portion 340 and presents GUI 640 containing the message 650 on display 130A (block 784). Method 700 ends at end block 790.

In response to determining that the first capacity 222 of ESD 174A is not greater than the second capacity 224 of ESD 174B, processor 102 generates GUI 640 that contains a message 650 indicating that electronic device 100 be held by second housing or upper portion 342 and presents GUI 640 containing the message 650 on display 130A (block 786). Method 700 ends at end block 790.

In the above-described methods of FIGS. 7A-7D, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:
a first housing coupled to a second housing by a hinge;
at least one power consuming component disposed within at least one of the first housing and the second housing;
a first energy storage device located in the first housing and selectively supplying power to the at least one power consuming component;
a second energy storage device located in the second housing and selectively supplying power to the at least one power consuming component;
at least one temperature sensor;
at least one second sensor;
a power source selection circuit comprising a switch that is switchably coupled to the first energy storage device and the second energy storage device enabling selective connection of a device power source that comprises one of the first energy storage device, the second energy storage device, and both the first and the second energy storage devices;
a memory having stored thereon a power source selection module (PSSM) for selecting at least one of the first energy storage device and the second energy storage device to power the at least one power consuming component based on at least one identified environmental factor; and
at least one processor communicatively coupled to the at least one temperature sensor, the at least one second sensor, the power source selection circuit, and to the memory, the at least one processor executing program code of the power source selection module, which enables the electronic device to:
receive a first temperature value from the at least one temperature sensor;
determine if the first temperature value is less than a threshold temperature value;
in response to the first temperature value being less than the threshold temperature value, detect, via the at least one second sensor, which of the first housing and the second housing is being held; and
in response to detecting the first housing is being held, trigger the power source selection circuit to: select the first energy storage device to provide power to the at least one power consuming component; and transition from drawing power from the second energy storage device.

2. The electronic device of claim 1, wherein the at least one processor:
in response to detecting that the second housing is being held, triggers the power source selection circuit to: select the second energy storage device to provide power to the at least one power consuming component; and transition from drawing power from the first energy storage device.

3. The electronic device of claim 1, wherein:
the at least one temperature sensor comprises at least one first temperature sensor disposed within the first housing and at least one second temperature sensor disposed within the second housing;
the first temperature value is received from the at least one first temperature sensor; and
the at least one processor:
receives a second temperature value from the at least one second temperature sensor;
determines if the second temperature value is greater than a second threshold temperature value;
in response to the second temperature value being greater than the second threshold temperature value, while a first temperature value is below the threshold temperature value established for the first temperature sensor, triggers the power source selection circuit to: select the second energy storage device to provide power to the at least one power consuming component; and transition from drawing power from the first energy storage device.

4. The electronic device of claim 1, wherein:
the at least one temperature sensor comprises at least one first temperature sensor disposed within the first housing and at least one second temperature sensor disposed within the second housing; and
the at least one processor:
monitors both a first temperature value from the first temperature sensor and a second temperature value from the second temperature sensor;

determines if the both the first and the second temperature values are greater than respective threshold temperature values; and in response to both the first temperature value and the second temperature value being greater than the respective first and second threshold temperature values, power the electronic device from both the first and second energy storage devices.

5. The electronic device of claim 1, further comprising:

at least one display communicatively coupled to the at least one processor; and the at least one processor:
 determines if a first remaining capacity of the first energy storage device is less than a threshold capacity;
 in response to the first remaining capacity of the first energy storage device being less than the threshold capacity, identifies if a second remaining capacity of the second energy storage device is greater than the first remaining capacity;
 in response to identifying that the second remaining capacity of the second energy storage device is greater than the first remaining capacity, generates a graphical user interface (GUI) that contains a first message indicating that holding of the electronic device be changed from the first housing to the second housing; and
 presents the GUI containing the first message on the display.

6. The electronic device of claim 1, further comprising:

at least one display communicatively coupled to the at least one processor; and the at least one processor:
 in response to detecting that both the first housing and the second housing are not being held, generates a graphical user interface (GUI) that contains a second message indicating how a user is to hold the electronic device; and
 presents the GUI containing the second message on the display.

7. The electronic device of claim 1, wherein:

the electronic device consumes power from the first energy storage device located in the first housing that is being held and the electronic device does not consume power from the second energy storage device located in the second housing that is not being held while an ambient temperature of the electronic device is below the threshold temperature value; and powering the electronic device from the first energy storage device located in the first housing that is being held, reduces a rate of battery drain of the first energy storage device and the second energy storage device.

8. The electronic device of claim 1, wherein:

the at least one temperature sensor further comprises:
 a second temperature sensor positioned in proximity to the second energy storage device within the second housing; and the at least one processor:
 monitors a second temperature value from the second temperature sensor;
 determines if the second temperature value is greater than a second threshold temperature value;
 in response to the second temperature value being greater than the second threshold temperature value, triggers the power source selection circuit to: select the second energy storage device to provide power to the at least one power consuming component; and transition from drawing power from the first energy storage device.

9. A method comprising:

receiving, via a processor, a first temperature value from at least one temperature sensor;

determining if the first temperature value is less than a threshold temperature value;

in response to the first temperature value being less than the threshold temperature value, detecting, via at least one second sensor, which of a first housing and a second housing is being held; and in response to detecting the first housing is being held, triggering a power source selection circuit to: select a first energy storage device to provide power to at least one power consuming component; and transition from drawing power from a second energy storage device.

10. The method of claim 9, further comprising:

in response to detecting that the second housing is being held, triggering the power source selection circuit to: select the second energy storage device to provide power to the at least one power consuming component; and transition from drawing power from the first energy storage device.

11. The method of claim 9, further comprising:

receiving a second temperature value from at least one second temperature sensor;

determining if the second temperature value is greater than a second threshold temperature value;

in response to the second temperature value being greater than the second threshold temperature value, while a first temperature value is below the threshold temperature value established for a first temperature sensor, triggering the power source selection circuit to: select the second energy storage device to provide power to the at least one power consuming component; and transition from drawing power from the first energy storage device.

12. The method of claim 9, further comprising:

monitoring both a first temperature value from a first temperature sensor and a second temperature value from a second temperature sensor;

determining if both the first and the second temperature values are greater than respective threshold temperature values; and in response to both the first temperature value and the second temperature value being greater than the respective first and second threshold temperature values, power an electronic device from both the first and second energy storage devices.

13. The method of claim 9, further comprising:

determining if a first remaining capacity of the first energy storage device is less than a threshold capacity;

in response to the first remaining capacity of the first energy storage device being less than the threshold capacity, identifying if a second remaining capacity of the second energy storage device is greater than the first remaining capacity;

in response to identifying that the second remaining capacity of the second energy storage device is greater than the first remaining capacity, generating a graphical user interface (GUI) that contains a first message indicating that holding of an electronic device be changed from the first housing to the second housing; and presenting the GUI containing the first message on a display.

14. The method of claim 9, further comprising:
in response to detecting that both the first housing and the second housing are not being held, generating a graphical user interface (GUI) that contains a second message indicating how a user is to hold an electronic device; and
presenting the GUI containing the second message on a display.

15. The method of claim 9, further comprising:
an electronic device consumes power from the first energy storage device located in the first housing that is being held and the electronic device does not consume power from the second energy storage device located in the second housing that is not being held while an ambient temperature of the electronic device is below the threshold temperature value; and
powering the electronic device from the first energy storage device located in the first housing that is being held, reduces a rate of battery drain of the first energy storage device and the second energy storage device.

16. The method of claim 9, further comprising:
monitoring a second temperature value from a second temperature sensor;
determining if the second temperature value is greater than a second threshold temperature value;
in response to the second temperature value being greater than the second threshold temperature value, triggering the power source selection circuit to: select the second energy storage device to provide power to the at least one power consuming component; and transition from drawing power from the first energy storage device.

17. A computer program product comprising:
a computer readable storage device having stored thereon program code which, when executed by at least one processor of an electronic device having at least one power consuming component, a first energy storage device, a second energy storage device, at least one temperature sensor, a least one second sensor, a power source selection circuit comprising a switch that is switchably coupled to the first energy storage device and the second energy storage device, and a memory, enables the electronic device to complete the functionality of:
receiving a first temperature value from the at least one temperature sensor;
determining if the first temperature value is less than a threshold temperature value;
in response to the first temperature value being less than the threshold temperature value, detecting, via the at least one second sensor, which of a first housing and a second housing is being held; and
in response to detecting the first housing is being held, triggering the power source selection circuit to: select the first energy storage device to provide power to the at least one power consuming component; and transition from drawing power from the second energy storage device.

18. The computer program product of claim 17, wherein the program code for selecting at least one of the first energy storage device and the second energy storage device to power the at least one power consuming component comprises program code that further enables the electronic device to complete the functionality of:
in response to detecting that the second housing is being held, triggering the power source selection circuit to: select the second energy storage device to provide power to the at least one power consuming component; and transition from drawing power from the first energy storage device.

19. The computer program product of claim 17, wherein the program code for selecting at least one of the first energy storage device and the second energy storage device to power the at least one power consuming component comprises program code that further enables the electronic device to complete the functionality of:
receiving a second temperature value from at least one second temperature sensor;
determining if the second temperature value is greater than a second threshold temperature value;
in response to the second temperature value being greater than the second threshold temperature value, while a first temperature value is below the threshold temperature value established for a first temperature sensor, triggering the power source selection circuit to: select the second energy storage device to provide power to the at least one power consuming component; and transition from drawing power from the first energy storage device.

20. The computer program product of claim 17, wherein the program code for selecting at least one of the first energy storage device and the second energy storage device to power the at least one power consuming component comprises program code that further enables the electronic device to complete the functionality of:
monitoring both a first temperature value from a first temperature sensor and a second temperature value from a second temperature sensor;
determining if both the first and the second temperature values are greater than respective threshold temperature values; and
in response to both the first temperature value and the second temperature value being greater than the respective first and second threshold temperature values, power the electronic device from both the first and second energy storage devices.

* * * * *